United States Patent
Rovner et al.

(10) Patent No.: US 9,631,962 B2
(45) Date of Patent: Apr. 25, 2017

(54) MAGNETIC CORE CONFIGURATION FOR MAGNETIC FLOWMETERS HAVING A PLURALITY OF LAYERS OF MAGNETICALLY PERMEABLE MATERIAL

(71) Applicant: Rosemount Inc., Chanhassen, MN (US)

(72) Inventors: Bruce D. Rovner, Minneapolis, MN (US); Samuel E. Messenger, Chaska, MN (US); Jared J. Dreier, Chaska, MN (US); John C. Beyl, Belle Plaine, MN (US)

(73) Assignee: Rosemount Inc., Chanhassen, MN (US)

( * ) Notice: Subject to any disclaimer, the term of this patent is extended or adjusted under 35 U.S.C. 154(b) by 0 days.

(21) Appl. No.: 14/502,519

(22) Filed: Sep. 30, 2014

(65) Prior Publication Data
US 2015/0268075 A1 Sep. 24, 2015

Related U.S. Application Data

(60) Provisional application No. 61/955,117, filed on Mar. 18, 2014.

(51) Int. Cl.
*G01F 1/58* (2006.01)
*G01F 1/60* (2006.01)

(52) U.S. Cl.
CPC .............. *G01F 1/60* (2013.01); *G01F 1/586* (2013.01)

(58) Field of Classification Search
None
See application file for complete search history.

(56) References Cited

U.S. PATENT DOCUMENTS

| | | | | | |
|---|---|---|---|---|---|
| 1,731,861 | A | * | 10/1929 | McRell | H01F 27/245 |
| | | | | | 252/62.55 |
| 2,691,303 | A | * | 10/1954 | De Boisblanc | G01F 1/58 |
| | | | | | 417/50 |
| 3,043,141 | A | * | 7/1962 | Waugh | G01F 1/80 |
| | | | | | 138/37 |
| 3,373,608 | A | * | 3/1968 | Ketelsen | G01F 1/586 |
| | | | | | 73/861.12 |

(Continued)

FOREIGN PATENT DOCUMENTS

| | | |
|---|---|---|
| DE | 10 2007 004826 | 8/2008 |
| DE | 10 2009 001413 | 9/2010 |

(Continued)

OTHER PUBLICATIONS

International Search Report and Written Opinion for International Application No. PCT/US2015/018880, date of mailing: May 29. 2015, date of filing: Mar. 5, 2015, 16 pages.

(Continued)

*Primary Examiner* — Harshad R Patel
(74) *Attorney, Agent, or Firm* — Christopher R. Christenson; Kelly, Holt & Christenson, PLLC

(57) ABSTRACT

A flowtube assembly for a magnetic flowmeter is provided. The flowtube assembly includes a flowtube configured to receive a flow of process fluid. A magnetic core is mounted relative to the flowtube and includes a plurality of layers of a magnetically permeable material. Each layer is substantially planar and is electrically insulated from others of the plurality of layers. A coil is disposed to generate a magnetic field having field lines that are substantially orthogonal to the plane of each layer.

26 Claims, 4 Drawing Sheets

(56) References Cited

U.S. PATENT DOCUMENTS

| | | | | |
|---|---|---|---|---|
| 3,610,040 | A | * | 10/1971 | Wada .................. G01F 1/586 |
| | | | | 73/861.12 |
| 3,739,640 | A | * | 6/1973 | Folts .................... G01F 1/58 |
| | | | | 600/504 |
| 3,815,582 | A | * | 6/1974 | Schuette ............ A61B 5/0265 |
| | | | | 600/504 |
| 3,839,913 | A | * | 10/1974 | Asado .................. G01F 1/586 |
| | | | | 73/861.12 |
| 4,098,118 | A | | 7/1978 | Schmoock |
| 4,156,882 | A | * | 5/1979 | Delagi .................. G11B 5/10 |
| | | | | 360/125.33 |
| 4,454,766 | A | | 6/1984 | Reinhold et al. |
| 4,649,639 | A | * | 3/1987 | Mas .................... H01F 27/25 |
| | | | | 29/605 |
| 4,688,431 | A | * | 8/1987 | Behrens ................ G01F 1/58 |
| | | | | 73/861.11 |
| 4,727,754 | A | * | 3/1988 | Ruckel .................. G01F 1/586 |
| | | | | 600/504 |
| 4,825,703 | A | * | 5/1989 | Kubota .................. G01F 1/58 |
| | | | | 73/861.12 |
| 4,899,592 | A | * | 2/1990 | Behrens ................ B22D 2/00 |
| | | | | 73/861.11 |
| 5,119,255 | A | * | 6/1992 | Gooch .................. G01R 33/00 |
| | | | | 360/115 |
| 5,125,276 | A | * | 6/1992 | Wada .................. G01F 1/588 |
| | | | | 73/861.12 |
| 5,207,105 | A | * | 5/1993 | Fukunaga ............ G01F 1/58 |
| | | | | 73/861.11 |
| 5,307,688 | A | * | 5/1994 | Lefebvre .............. G01F 1/60 |
| | | | | 73/861.12 |
| 5,325,728 | A | * | 7/1994 | Zimmerman ........ A61B 5/0265 |
| | | | | 600/504 |
| 5,385,055 | A | | 1/1995 | Kubota et al. |
| 5,461,771 | A | * | 10/1995 | Wada .................. H01F 41/0233 |
| | | | | 219/121.69 |
| 5,540,103 | A | | 7/1996 | Zingg |
| 6,085,599 | A | | 7/2000 | Feller |
| 6,237,424 | B1 | * | 5/2001 | Salmasi .................. G01F 1/002 |
| | | | | 73/861.11 |
| 6,463,807 | B1 | | 10/2002 | Feller |
| 7,977,841 | B2 | * | 7/2011 | Yang .................... H02K 1/02 |
| | | | | 310/181 |
| 9,097,566 | B2 | | 8/2015 | Rogers et al. |
| 2004/0149046 | A1 | * | 8/2004 | Yamazaki ............ G01F 1/588 |
| | | | | 73/861.12 |
| 2005/0157434 | A1 | * | 7/2005 | Ito .................... G11B 5/3906 |
| | | | | 360/324.2 |
| 2005/0183514 | A1 | * | 8/2005 | Huybrechts .......... G01F 15/006 |
| | | | | 73/861.12 |
| 2007/0216511 | A1 | * | 9/2007 | Tseng .................. H01F 3/10 |
| | | | | 336/208 |
| 2009/0188327 | A1 | | 7/2009 | Shanahan et al. |
| 2011/0094090 | A1 | * | 4/2011 | Shang .................. H01F 17/04 |
| | | | | 29/602.1 |
| 2012/0032674 | A1 | * | 2/2012 | Rajula .................. G01R 33/04 |
| | | | | 324/253 |
| 2012/0268108 | A1 | * | 10/2012 | Hozoi .................. G01R 15/202 |
| | | | | 324/202 |
| 2015/0212225 | A1 | * | 7/2015 | Reiderman ............ G01V 3/32 |
| | | | | 324/303 |

FOREIGN PATENT DOCUMENTS

| | | |
|---|---|---|
| EP | 0 418 033 B1 | 12/1994 |
| WO | WO 2013/010715 | 1/2013 |

OTHER PUBLICATIONS

The International Search Report and Written Opinion of the International Searching Authority for PCT/US2014/052464. [9 pages].
Rosemount E-Series Magnetic Flowmeters . Brochure. 7 pages. Dec. 2010.

* cited by examiner

MAGNETIC CORE CONFIGURATION FOR MAGNETIC FLOWMETERS HAVING A PLURALITY OF LAYERS OF MAGNETICALLY PERMEABLE MATERIAL

CROSS-REFERENCE TO RELATED APPLICATION

The present application is based on and claims the benefit of U.S. Provisional Patent Application Ser. No. 61/955,117, filed Mar. 18, 2014, the content of which is hereby incorporated by reference in its entirety.

BACKGROUND

Magnetic flowmeters (or mag meters) measure flow by application of Faraday's Law, an electromagnetic effect. The magnetic flowmeter energizes one or more coils by passing an excitation current through field windings which generates a magnetic field across an electrically isolated, conductive process flow. An electromotive force (EMF) is generated by the flowing process fluid crossing through the magnetic field; this induced voltage (potential) both across the fluid and with respect to the rest of the process fluid can readily be measured by one or more conductive electrodes that contact the flowing process fluid. Alternatively, some magnetic flowmeters employ capacitive coupling between the electrodes and the process fluids such that the potential can be measured without direct electrical connection to the process. The volumetric flow is proportional to the flow velocity and the cross-sectional area of the flowtube. As the flow velocity is directly proportional to the electrode voltage potential (EV), the electrode voltage potential (EV) is directly proportional to the induced magnetic field strength (B), and the induced magnetic field strength is assumed to be proportional to the applied magnetic field (H), which is directly linked to the magnitude of the excitation current, a direct correlation is provided between measured electrode voltage potential and indicated volumetric flow.

Magnetic flowmeters are useful in a variety of conductive and semi-conductive fluid flow measurement environments. In particular, the flow of water-based fluids, ionic solutions and other conducting fluids can all be measured using magnetic flowmeters. Thus, magnetic flowmeters can be found in water treatment facilities, beverage and hygienic food production, chemical processing, high purity pharmaceutical manufacturing, as well as hazardous and corrosive processing facilities. Magnetic flowmeters are often employed in the hydrocarbon fuel industry which sometimes employs hydraulic fracturing techniques using abrasive and corrosive slurries.

SUMMARY

A flowtube assembly for a magnetic flowmeter is provided. The flowtube assembly includes a flowtube configured to receive a flow of process fluid. A magnetic core is mounted relative to the flowtube and includes a plurality of layers of a magnetically permeable material. Each layer is substantially planar and is electrically insulated from others of the plurality of layers. A coil is disposed to generate a magnetic field having field lines that are substantially orthogonal to the plane of each layer.

DETAILED DESCRIPTION OF ILLUSTRATIVE EMBODIMENTS

Figure 1:
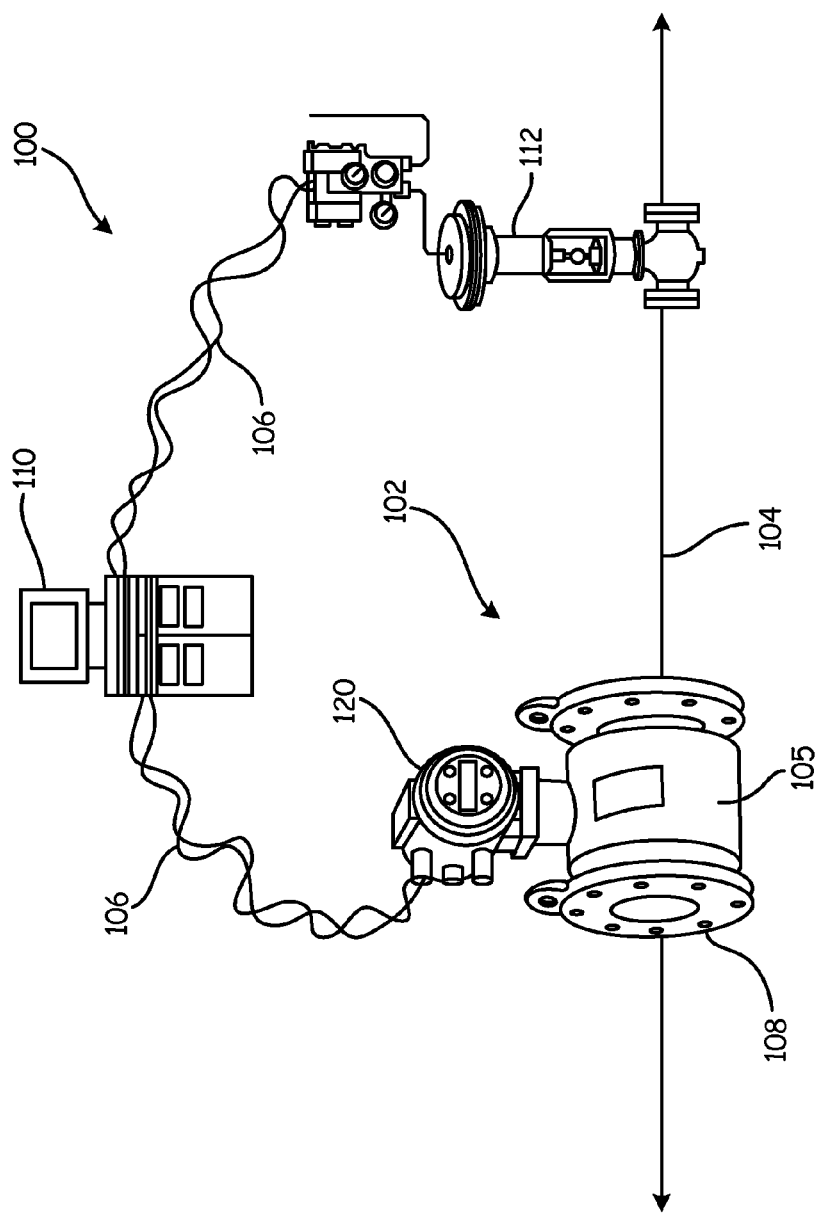
FIG. 1 is a diagrammatic view showing a process control system including a magnetic flowmeter.

FIG. 1 illustrates a typical environment 100 for magnetic flowmeter 102. Magnetic flowmeter 102 is coupled to process piping, illustrated diagrammatically at line 104 that also couples to control valve 112. Magnetic flowmeter 102 is configured to provide a flow rate output relative to process fluid flow through piping 104 in a process. Examples of such process fluids includes slurries and liquids in chemical, pulp, pharmaceutical and other fluid processing plants.

Magnetic flowmeter 102 includes electronics housing 120 connected to flowtube 108. Magnetic flowmeter 102 outputs are configured for transmission over long distances to a controller or indicator via process communication connection 106. In typical processing plants, communication connection 106 can be either a digital communication protocol, or an analog communication signal. The same or additional process information can be made available via wireless communication, pulse width or frequency output, or discrete input/outputs (DI/DO). System controller 110 can display flow information for a human operator as well as provide control signals over process communication connection 106 in order to control the process using control valves, such as valve 112.

Figure 2:
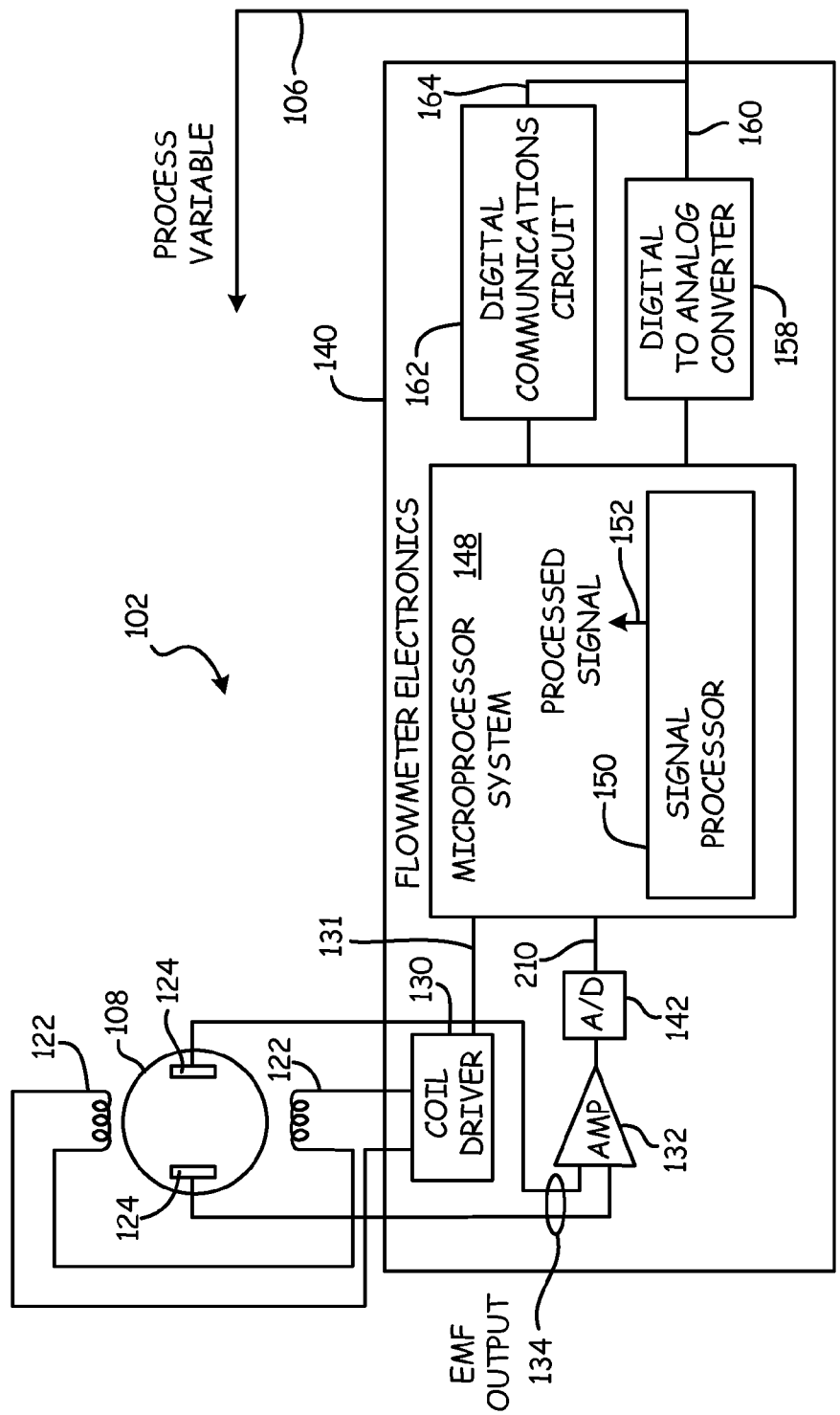
FIG. 2 is a block diagram of a magnetic flowmeter with which embodiments of the present invention are particularly applicable.

FIG. 2 is a block diagram of a magnetic flowmeter with which embodiments of the present invention are particularly applicable. Magnetic flowmeter 102 measures a flow of conductive process fluid through flowtube assembly 108. Coils 122 are configured to apply an external magnetic field in the fluid flow in response to an applied excitation current from coil driver 130. EMF sensors (electrodes) 124 electrically couple to the fluid flow and provide an EMF signal output 134 to amplifier 132 related to an EMF generated in the fluid flow due to the applied magnetic field, fluid velocity, and noise. Analog-to-digital converter 142 provides a digitized EMF signal to microprocessor system 148. A signal processor 150 is implemented in microprocessor system 148 of flowmeter electronics 140 which couples to the EMF output 134 to provide an output 152 related to fluid velocity.

Microprocessor system 148 calculates fluid flow velocity through flowtube 108 in accordance with a relationship between the EMF output 134 and flow velocity as described in an application of Faraday's Law:

$$V = \frac{E}{kBD}$$

Where E can be the signal output 152 which is related to the EMF output 134, V is the velocity of the fluid, D is the diameter of the flowtube 108, B is the strength of the induced magnetic field in the fluid, and k is a constant of proportionality. A nuance of this application of Faraday's law is that the excitation current, I, is considered directly proportional to B, the induced magnetic field. Coil driver 130 provides both the excitation current and a measurement of the either the induced magnetic field or excitation current, which is important for the accuracy of the velocity measurement. The measurement of the excitation current is provided through line 131. Microprocessor system 148 uses velocity and measured magnetic field or coil current to calculate flow of the process fluid in accordance with known techniques. A digital-to-analog converter 158 coupled to microprocessor system 148 and generates an analog transmitter output 160 for coupling to communication bus 106. A digital communication circuit 162 generates a digital transmitter output 164. The analog output 160 and/or the digital output 164 can be coupled to process controllers or monitors as desired.

While embodiments of the present invention are applicable to all magnetic flowmeters, they are particularly relevant to magnetic flowmeters with relatively small diameter flowtubes. For these relatively small line size flowtubes, the inclusion of conventional magnetic cores or the use of an air-core construction when realizing the field winding construction can cause the coil driver circuitry of the magnetic flowmeter to oscillate due to the high Q (quality factor) of the inductance formed by the many turns of the field coils. Approaches that include using solid steel or less expensive core materials can be used to minimize the Q but often introduce unacceptable phase lag between the applied magnetic field (H) that the excitation current supplies and the induced magnetic field (B), introducing error in the system.

Creating a magnetically efficient, low reluctance, high gain magnetic circuit that presents an easy-to-drive load to coil driver electronics while maintaining sufficient magnetic field fidelity to the excitation current would represent an improvement to the current art of magnetic flow measurement.

In accordance with various embodiments set forth below, an orthogonal core magnetic flowmeter flowtube design provides the ability to precisely and directly control the quality factor (Q), inductance (L) and resistance (R) that is the load to the coil driver while providing the necessary frequency response and fast settling time required to construct an accurate and repeatable flowmeter system. Controlling the Q of the inductive load via core construction allows the designer to lower the resistance of the field windings and still provide a suitable dampening factor to the system, allowing easier stabilization of the excitation current. This allows the resistive element of the field coils to be lowered, lowering the resistive power dissipated in the windings. Embodiments provided below may potentially use less copper than traditional flowtube constructions thereby enhancing magnetic efficiency.

Due to the implied limitations of Faraday's Law of electromagnetic induction, when the conductor, $\lambda$, (the inside diameter, D, of the flowtube) is small, a high B field is needed in order to provide the necessary produced voltage E, requiring a high number Amp-Turns to be used to produce the applied field, H. As a matter of efficiency, a large number of turns of magnetic wire are used, holding the current portion of the Amp-Turns constant. This drives the inductance high by virtue of the relationship $L=N^2s$, where N is the number of turns. As such, it is especially difficult to make small line size magnetic circuits with acceptably low L and Q values that have sufficient magnetic performance with low hysteresis.

Subsequently, a magnetic core was developed using laminations that are substantially planar and oriented such that the plane of the laminations is substantially orthogonal to the magnetic flux induced in the flowtube. The use of a magnetically compliant material in the layers of the laminations orthogonal to the induced flux directly reduces both the inductance and quality factor of said inductance. This allows the magnetic circuit to be seen more as a resistive load over frequency to the output stage of the coil drive. Specifying the thickness, type and number of the laminations in the core, in addition to the type and thickness of the insulating electrical coating between each layer, allows the reluctance of the circuit, allowable hysteresis, and interchangeability of the magnetic circuit to be precisely controlled.

Figure 3:
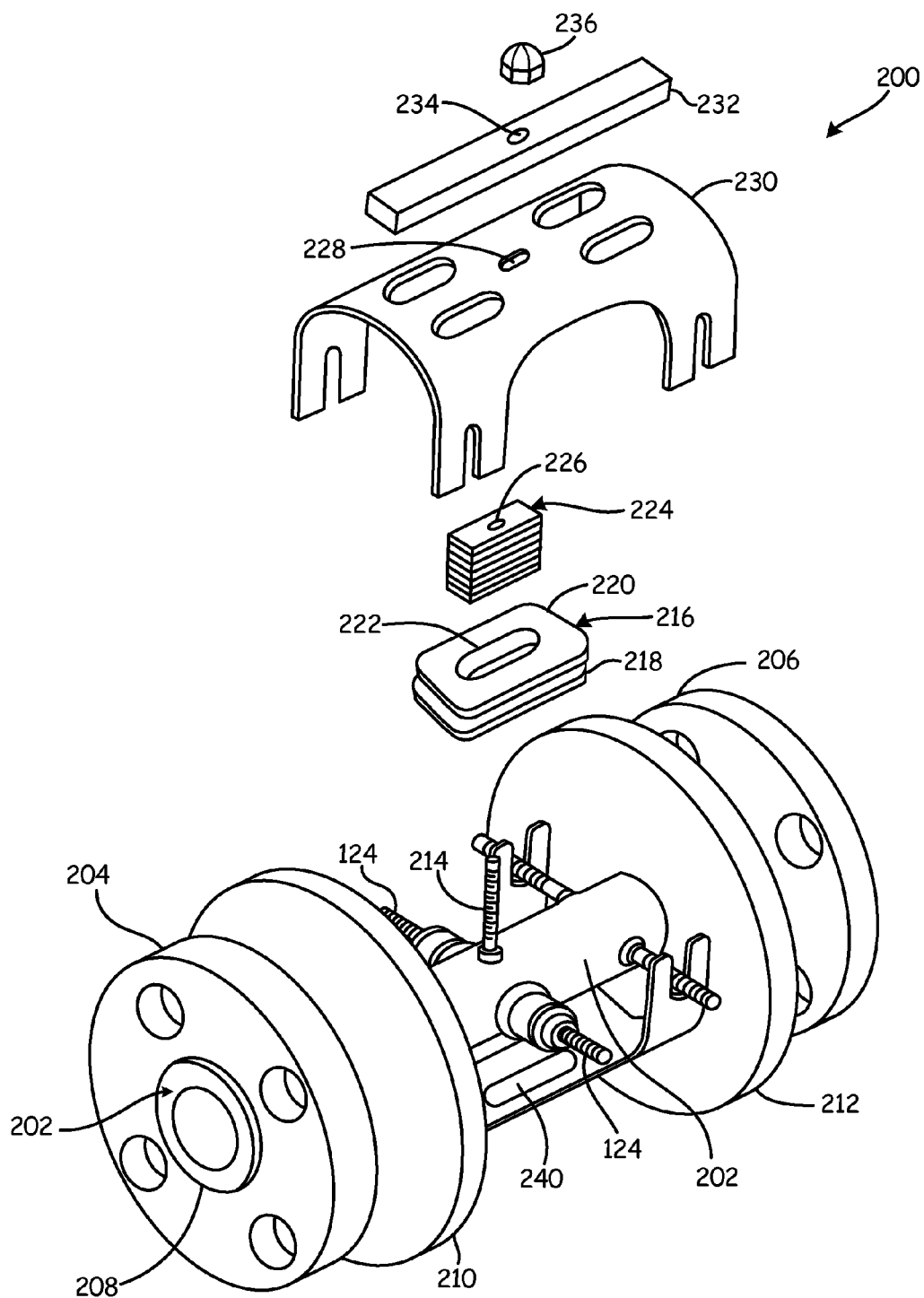
FIG. 3 is a perspective view of a magnetic flowmeter flowtube assembly in accordance with of the present invention.

FIG. 3 is a diagrammatic perspective view of a magnetic flowmeter flowtube assembly in accordance with an embodiment of the present invention. Flowtube assembly 200 includes flowtube 202 that extends between pipe mounting flanges 204, 206. Additionally, non-conductive liner 208 is generally provided within flowtube 202 such that the process fluid does not contact the flowtube 202, which is generally metallic. A pair of end caps 210, 212 are disposed between pipe mounting flanges 204, 206. A cylindrical cover (not shown in FIG. 3) can be mounted to end caps 210, 212. While the cover is not shown in FIG. 3, its depiction is similar to that illustrated diagrammatically at reference numeral 105 in FIG. 1. Electrodes 124 are mounted on opposite sides of flowtube 202 and extend into the flowtube 202 through liner 208 such that, in some embodiments, they make direct contact with the process fluid. A mounting stud 214 is illustrated being attached to flowtube 202 and extending upwardly therefrom. The exploded view shown in FIG. 3 illustrates the upper portion of the assembly in exploded form. However, the lower portion of the assembly is not illustrated in exploded form, but is shown diagrammatically at reference numeral 240. Thus, a pair of coils and magnetic cores cooperate to direct a magnetic field through flowtube 202, where the magnetic field has field lines that are substantially vertical (with respect to the arrangement shown in FIG. 3) orientation.

Spool 216 includes a pair of flanges 218 and 220 that contain a number of windings of electrical wire therebetween. Spool 216 also includes an inner diameter 222 that is sized and shaped to receive magnetic core 224. Accordingly, the windings of spool 216 are arranged such that they run substantially around the outside of magnetic core 224. The spool/winding subassembly may be considered to be a coil that generates a magnetic field across the flowtube. In accordance with an embodiment of the present invention, these field lines travel substantially orthogonally through the plane of individual laminations of magnetic core 224. Magnetic core 224 includes a bore or aperture 226 that is sized to allow mounting stud 214 therethrough. However, any suitable methods for mounting magnetic core 224 can be used.

To assemble the exploded components of FIG. 3, core 224 is placed within inner diameter 222 and aperture 226 of core 224 is placed upon mounting stud 214. Further, aperture 226 of magnetic return assembly 230 is also slid over mounting stud 214. Magnetic return assembly 230 is brought into close contact with magnetic core 224 by virtue of support bar 232 being mounted with aperture 234 slide over mounting stud 214. Finally, mounting nut 236 compresses the entire assembly onto flowtube 202. As can be appreciated, substantial planar contact is provided between magnetic core 224 and magnetic return assembly 230. Accordingly, the interface between the magnetic core and magnetic return assembly 230 allows close-coupling of the two parts of the magnetic circuit. This increases the ease of construction and provides very repeatable, measureable parameters in the total magnetic circuit. Further, in some embodiments, the same type of magnetic material may be used for both the laminations of magnetic core 224 and magnetic return assembly 230. More specifically, in one embodiment, each of magnetic core 224 and magnetic return assembly 230 is constructed of suitable magnetic material, such as high-grade silicon steel. However, embodiments of the present invention can be practiced where the magnetic core and the magnetic return assembly are not constructed from the same material. As can be appreciated, when the apparatus illustrated in FIG. 3 is assembled, a closed magnetic circuit is provided even in the absence of the flowtube cover. This means that the assembly can be tested before any housing is attached and that new housing materials can be selected independently from the magnetic circuit as they become desirable in the future.

Figure 4A:
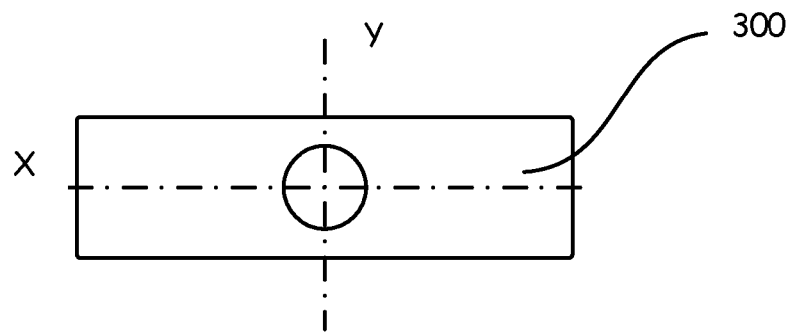
FIGS. 4A and 4B are top plan and side elevation views, respectively, of a magnetic core of a magnetic flowmeter in accordance with an embodiment of the present invention.
Figure 4B:
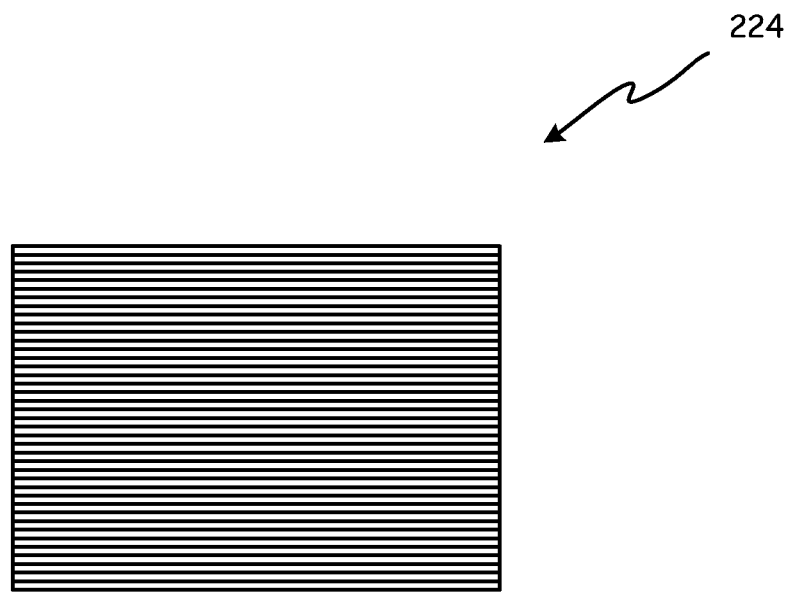

FIGS. 4A and 4B are top plan and side elevation views, respectively, of a magnetic core assembly in accordance with an embodiment of the present invention. Magnetic core assembly 224 is comprised of a plurality of stacked individual metallic layers. Each such layer is formed of a magnetically permeable material and insulated from its neighbors by insulating layers. In some embodiments, the individual metallic layers may be coated in the insulating material, such as a varnish. However, any suitable insulating configuration can be employed in accordance with embodiments of the present invention. As shown in FIG. 4B, 40 individual layers are illustrated. Additionally, as shown in FIG. 4A, each individual layer 300 is substantially symmetrical in both x and y axes. Further still, individual edges and corners are smooth, in some embodiments. As set forth above, various parameters of the circuit provided to the coil driver, such as Q, L, and R can be adjusted by selecting the physical parameters of the magnetic core and field windings in combination to allow for performance optimization. For example, the number of laminations, lamination material, lamination thickness, and/or orientation can be selected in order to adjust reluctance, quality factor of the inductance, and inductance. Additionally, specifying the type and thickness of the insulating material can also allow additional parameters of the magnetic circuit, such as reluctance, $\mathcal{R}$, to be directly controlled.

It is believed that embodiments of the present invention will enable a more robust current control loop, ensuring system stability over a wider operating range, while still being realized in a constructionally constrictive space. Additionally, the manipulation of the geometry and intensity of the applied magnetic field can be provided in accordance with the various embodiments described herein. This "shaping" of the imposed field allows the construction to provide different sample-paths of the flow profile—for example, in larger sizes, the core may be rotated so the widest portion of the core (and therefore the widest portion of the field) is across the entire flow profile.

An additional advantage is provided by the close coupling of the field. This, in turn, drives very low Amp-Turn requirements. The low Amp-Turn requirements may be directly applied to a low power magnetic flowmeter, that could, in fact, be powered by a two-wire, 4-20 mA control loop or a battery. This would provide very low copper (resistive) losses but with a magnetic circuit with sufficiently low Q to provide the necessary stability for the current-control loop.

The close-coupled field also provides the ability to provide a high frequency/high sample rate magnetic flowmeter. This is in part because the low Amp-Turns provides a much lower inductance, and the lower Q allows a more aggressive (underdamped) coil control, which allows the coil excitation to be driven at higher frequencies and/or with different wave forms. For example, a 500 Hz sinusoidal coil drive signal could be used. This would allow an improved signal-to-noise ratio (SNR) because it would elevate the flow signal above the 1/f noise typically present in the process flow signal.

Although the present invention has been described with reference to preferred embodiments, workers skilled in the art will recognize that changes may be made in form and detail without departing from the spirit and scope of the invention.

What is claimed is:

1. A flowtube assembly for a magnetic flowmeter, the flowtube assembly comprising:
   a flowtube having a longitudinal axis and being configured to receive a flow of process fluid therethrough;
   a first magnetic core mounted relative to the flowtube, the first magnetic core including a plurality of layers of a magnetically permeable material, wherein each layer is substantially planar, wherein each respective plane is disposed substantially parallel to the longitudinal axis of the flowtube, and is electrically insulated from others of the plurality of layers; and
   a first coil disposed to generate a magnetic field having field lines that are substantially orthogonal to the plane of each layer.

2. The flowtube assembly of claim 1, wherein the plurality of layers are stacked.

3. The flowtube assembly of claim 1, wherein each of the plurality of layers is coated in an insulating material.

4. The flowtube assembly of claim 3, wherein the insulating material is varnish.

5. The flowtube assembly of claim 1, wherein a physical parameter of the first magnetic core is selected based on a desired electrical characteristic of the first magnetic core.

6. The flowtube assembly of claim 5, wherein the physical characteristic is a number of layers in the plurality of layers.

7. The flowtube assembly of claim 5, wherein the physical characteristic is a thickness of each layer.

8. The flowtube assembly of claim 5, wherein the physical characteristic is a material with which each layer is constructed.

9. The flowtube assembly of claim wherein the physical eristic is layer orientation.

10. The flowtube assembly of claim 5, wherein the physical characteristic is a material used to insulate each layer from the others.

11. The flowtube assembly of claim 5, wherein the physical characteristic is insulation thickness.

12. The flowtube assembly of claim 5. wherein the desired electrical characteristic is inductance.

13. flowtube assembly of claim 5, wherein the desired electrical characteristic is resistance.

14. The flowtube assembly of claim 1, wherein a physical parameter of the first magnetic core is selected based on a desired magnetic characteristic of the first magnetic core.

15. The flowtube assembly of claim 14, wherein the desired magnetic characteristic is reluctance.

16. The flowtube assembly of claim 1, and further comprising a mounting stud affixed to the flowtube and mounting the first magnetic core and a spool to the flowtube.

17. The flowtube assembly of claim 1, and further comprising a magnetic return assembly formed of a magnetically permeable material and coupled to the first magnetic core.

18. The flowtube assembly of claim 17, wherein the magnetic return assembly and the first magnetic core are formed of the same magnetically permeable material.

19. The flowtube assembly of claim 18, wherein the magnetically permeable material is silicon steel.

20. The flowtube assembly of claim 1, and further comprising:
   a second magnetic core mounted opposite the first magnetic core on the flowtube, the second magnetic core including a plurality of layers of a magnetically permeable material, wherein each layer is substantially planar and is electrically insulated from others of the plurality of layers; and
   a second coil disposed to generate a magnetic field having field lines that are substantially orthogonal to the plane of each layer.

21. The flowtube assembly of claim 1, and further comprising a pair of electrodes disposed to contact the process fluid.

22. A magnetic flowmeter for measuring a flow velocity of a process fluid, the magnetic flowmeter comprising:
   a flowtube assembly including:
   a flowtube having a longitudinal axis and being configured to receive a flow of process fluid therethrough;
   a pair of magnetic cores mounted on opposite sides of the flowtube, each magnetic core including a plurality of layers of a magnetically permeable material, wherein each layer is substantially planar, and substantially parallel to the longitudinal axis, and is electrically insulated from others of the plurality of layers;
   a pair of coils, each being disposed to generate a magnetic field having field lines that are substantially orthogonal to the plane of each layer;
   a pair of electrodes disposed to contact process fluid flowing through the flowtube; and
   flowmeter electronics coupled to the pair of electrodes and to the pair of coils, the flowmeter electronics being configured to generate a magnetic field via the pair of coils and measure an induced electromotive force (EMF) induced in the process fluid via the pair of electrodes.

23. The magnetic flowmeter of claim 22, wherein the flowmeter includes circuitry for coupling to a wired process communication loop and wherein the magnetic flowmeter is wholly powered by the process communication loop.

24. The magnetic flowmeter of claim 22, wherein the magnetic flowmeter is battery-powered.

25. The magnetic flowmeter of claim 22, wherein the flowmeter electronics are configured to provide an excitation signal to the pair of coils, and wherein a frequency of the excitation signal is about 500 Hz.

26. The magnetic flowmeter of claim 22, wherein the flowmeter electronics are configured to provide an excitation signal to the pair of coils that is sinusoidal.

* * * * *

UNITED STATES PATENT AND TRADEMARK OFFICE
CERTIFICATE OF CORRECTION

| | | |
|---|---|---|
| PATENT NO. | : 9,631,962 B2 | Page 1 of 1 |
| APPLICATION NO. | : 14/502519 | |
| DATED | : April 25, 2017 | |
| INVENTOR(S) | : Bruce D. Rovne et al. | |

It is certified that error appears in the above-identified patent and that said Letters Patent is hereby corrected as shown below:

In the Claims

Column 6, Line 43: insert --5-- after "of claim".

Signed and Sealed this
Eleventh Day of July, 2017

Joseph Matal
*Performing the Functions and Duties of the*
*Under Secretary of Commerce for Intellectual Property and*
*Director of the United States Patent and Trademark Office*